United States Patent [19]

Chika

[11] 4,350,369
[45] Sep. 21, 1982

[54] VEHICLE OCCUPANT RESTRAINING DEVICES

[76] Inventor: John J. Chika, 1350 Orchard Ridge Rd., Bloomfield Hills, Mich. 48013

[21] Appl. No.: 184,806

[22] Filed: Sep. 8, 1980

[51] Int. Cl.³ .......................................... B60R 21/10
[52] U.S. Cl. .................................... 280/804; 280/808
[58] Field of Search ............ 280/804, 808, 803, 802; 24/196; 180/270

[56] References Cited

U.S. PATENT DOCUMENTS

| | | | |
|---|---|---|---|
| 3,822,760 | 7/1974 | Lindblad | 280/804 |
| 3,847,434 | 11/1974 | Weman | 280/808 |
| 3,885,810 | 5/1975 | Chika | 280/748 |
| 4,213,652 | 7/1980 | Irwin | 280/804 |

Primary Examiner—Robert R. Song

[57] ABSTRACT

An apparatus to position a 3-point restraining device to and out of immediate proximity to a person seated in a car. Its operation may be manual, mechanically assisted, automatic or fully passive. A length of webbing or cable has one end anchored to vehicle floor back and inboard of its seated user, the other end anchored back and inboard of his head to a "Central-Post". The door panel or body side closest to the seat supports a diagonally disposed track channel over which slides a belt carrier supporting the mid-portion of the device and dividing it into lap-belt and shoulder-belt portions. When the vehicle door is opened, it causes the belt carrier to slide forward and upward, removing the device away from its user; when it is closed, the device is repositioned and locked over its user's lap and chest. The apparatus is usable with most seats of most motor vehicles and accepts various auxiliary protective devices.

41 Claims, 17 Drawing Figures

VEHICLE OCCUPANT RESTRAINING DEVICES

CROSS REFERENCES TO RELATED PATENTS

U.S. Pat. No. 2,749,143—6/1956, Chika, 280/751
U.S. Pat. No. 3,885,810—5/1975, Chika, 280/748
U.S. Pat. No. 3,893,703—7/1975, Chika, 280/753
U.S. Pat. No. 3,968,994—7/1976, Chika, 297/486
U.S. Pat. No. 4,063,778—12/1977, Chika, 297/465
U.S. Pat. No. 4,217,970—8/1980, Chika, 180/298.

BACKGROUND OF THE INVENTION

Before 1950 Chika developed a "Safety-Table" device to protect the occupant of the "guest seat" sitting next to the driver of a vehicle, as in U.S. Pat. No. 2,749,143. When the concept of "passive restraints" was introduced, Chika developed a "passive type" of his "Safety-Table" as in U.S. Pat. No. 3,893,703. Because the front seats of vehicles were prone to tear off the vehicle floor during any severe collision, Chika developed a "Central-Post" as in U.S. Pat. No. 3,885,810, not only to anchor the seats to the floor but to provide stronger anchor means for variously conceived restraining devices and to provide roof support in a roll-over crash. Since people complain that shoulder straps "cut and bruise them", Chika developed the "Top-Guard" as in U.S. Pat. No. 3,968,994, and to provide the ultimate in human packaging, he developed the "Auto-Vest" as in U.S. Pat. No. 4,063,778. Presently the demand is for the "automatic positioning" of the shoulder harness to and from the proximity of its user, and Chika offers the following possible solution as disclosed herein.

Since presently the new Fourth Edition of M P E P, 1868, "Unity of Invention", page 469, second column, titled "The Requirements for Unity of Invention" states: "Any international application must relate to one invention only, OR to a group of inventions so linked as to form a single general invention concept" etc. etc., therefore, since all of the above listed references and this instant application fall into this qualification, this applicant intends to secure the International Patent protection for this overall general invention concept as presently disclosed in this instant U.S. National Application for it and hopefully be able to file the International Application on time within a year.

FIELD OF THE INVENTION

Most of the existing body restraining devices such as safety lap belts and shoulder belts installed in todays automobiles are criticized as inconvenient to find, hard to reach and buckle, very unsanitary and suspected of being able to cause harm to tender parts of their user's anatomy during a collision of the vehicle. This invention tries to alleviate these problems and offers either fully passive, automatic, semi-automatic or power assisted hand operated means of positioning greatly improved restraining devices into and out of immediate proximity to their seated users.

DESCRIPTION OF THE PRIOR ART

There is some related prior art developed since the struggle between the so called "air-bag" concept and the simple webb-type shoulder harness erupted during the last decade, but none of it relates to anchoring the upper end of the shoulder-belt portion to a separate, specifically configured device as the "Central-Post". Also, the use of the sanitary and less cumbersome, vinyl tube enclosed nylon cables in place of the usual webbing and the use of auxiliary body restraining accessories with them is entirely novel.

A Disclosure Document No. 089433 covering this invention was receipted on Mar. 26, 1980, in order to allow this applicant more time to change his application to the International type of application.

SUMMARY OF THE INVENTION

The purpose of this invention is to provide a novel way of positioning variously configured body restraining devices to and from immediate proximity of the seated occupants of variously configured motor vehicle seats either by manually operated and powered means, by mechanically assisted semi-automatic means, by electrically powered automatic means and by electrically powered and controlled fully "passive" means.

Another object is to provide the choice of several auxililary devices usable with this basic body restraining means and offering various degrees of personal, additional protection, convenience and comfort for its users.

Still another object is to provide easy, automatic storage for such personal accessories by allowing them to remain attached to the shoulder belt portions at all times.

Also, all disclosed configurations of this invention provide the utmost protection for their users in all types of collisions impact from any direction and of any duration, regardless if such devices are of the simplest "halter" type or of the most sophisticated fully automatic or "passive" configuration.

By using the vinyl covered nylon cables in place of the commonly used webbing, entirely new dimensions in acceptability and usage of shoulder type, three point restraining devices are possible. When the traveling public becomes more knowledgeable about restraining means of this type, the vinyl-tube covered nylon cables will become universaly accepted as more efficient, more sanitary and less cumbersome than the existing belt-types.

When further modified, this invention provides the ultimate in personal safety by combining it with either the "Top-Guard" or the "Auto-Vest".

Finally, by removing the upper anchor means from either the roof rail or the window frame of the door, easier access to the back seats of all two-door vehicles is provided.

This disclosure is directed primarily to the protection of occupants of the front seat compartments of motor vehicles provided with side doors and secondly to protection of occupants of the rear seat compartments with or without a door; however, these concepts may be easily modified for use in many other types of private and public transportation vehicles.

BRIEF DESCRIPTION OF THE DRAWINGS

To further explain this concept and its many improvements over the existing art of record, the following drawings are enclosed.

DESCRIPTION OF THE PREFERRED EMBODIMENTS

Figures 1, 7:
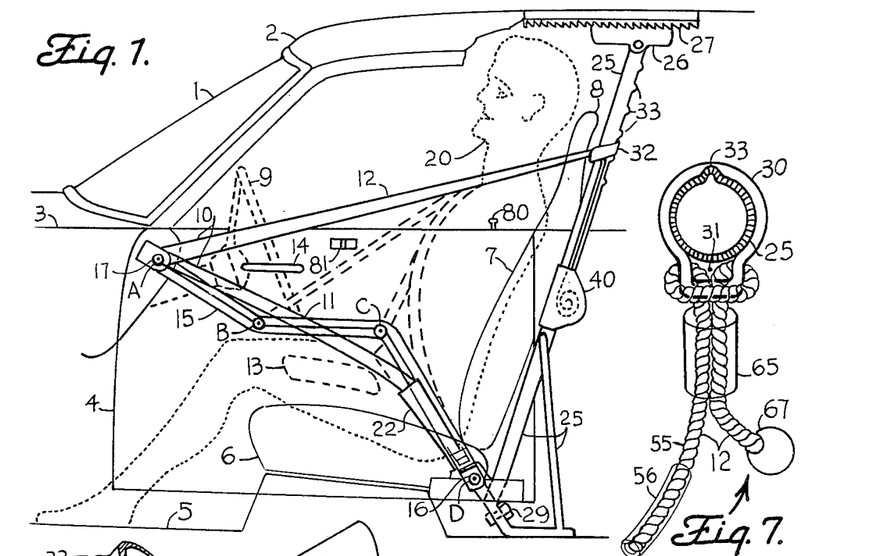
FIG. 1 is a partial side view of the restraining device.
FIG. 7 shows another way to anchor cable type device.

Referring now to the drawings in more detail, like numerals are used throughout all various views to designate substantially like parts. It is suggested to consider FIGS. 1, 2 and 3 together to gain overall operative concept of this invention. FIG. 1 shows a side view of a typical two-door vehicle with its body 1 comprising roof 2, lower body side 3, with its door panel 4. The vehicle floor 5 supports seat cushion 6 with seat-back cushion 7 and head-rest 8.

The driver 20 is seated behind the steering wheel 9 and next to the door-panel 4 with its arm-rest 13, door-handle 14 and door lock 80. He is shown using the three-point body restraining device 10 comprising lap-belt portion 11 and shoulder belt portion 12. The lower inboard end of the lap-belt portion is secured, preferably adjustably, to the floor 5 or to the specifically configured structure of "Central-Post" 25 at point 29. The upper inboard end of the shoulder-belt portion 12 goes through the appertured upper anchor means 32 which is adjustably securable to the upper portion of the "Center-Post" 25 and then is retractably secured within the emergency locking retractor 40 secured to the lower portion of the post 25. The mid-portion of the one-piece restraining belt 10 is slidably supported by means of properly appertured belt carrier assembly 35 which is configured to be operatively slidable along a track channel means 15 secured diagonally across the inner surface of the door panel 4 and reaching from its upper front terminal 17 at point A through intermediate points B, C to point D located at its lower back terminal 16.

All other pertinent details of the "Central-Post" assembly 25 are fully disclosed in Chika's U.S. Pat. No. 3,885,810, and the only modifications of it presented herein are the means to permanently or adjustably secure it to the flat floor of vehicles without center tunnel and means to secure its upper end to reinforced roof panel 2 either permanently or adjustably by means of ratchet member 27 operatively engaging with ratchet means 26 pivotally secured to the upper end of the post 25. Seat cushions 6 are also attached to the lower portion of post 25 to prevent their dislocation during a collision of the vehicle, and the two-end securement of the post 25 not only prevents the vehicle roof from collapsing during a collision but prevents the post itself from dislocation or jacknifing during a severe collision of the vehicle.

Figures 2, 3, 6, 11:
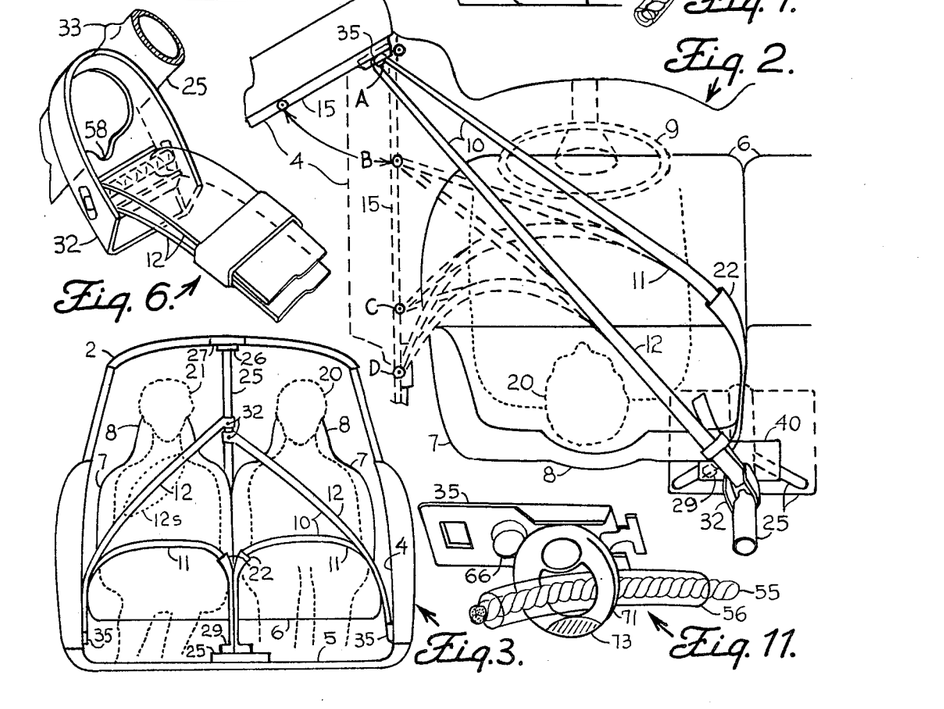
FIG. 2 is a partial plan view of the same device.
FIG. 3 is a partial front view of a typical front seat layout.
FIG. 6 shows one way to anchor the top of the device.
FIG. 11 shows another way to slidably anchor the cable device.

Also, because of the unique geometry of this concept, much shorter length of webbing or cable comprising the restraining means 10 is subjected to repeated winding and unwinding, and in some economy configurations the retractor 40 may be eliminated, with necessary length adjustment provided for at upper anchor means 32 as better shown in FIGS. 6 and 7.

This is the basic concept of this invention and provides for the passenger restraining system 10 to be usable in several modes of application, the basic one being the positioning of it into and out of the immediate proximity to the occupant of thus equipped vehicle seat.

Thus, FIGS. 1 and 2 clearly show that the restraining system 10 reaching from point A and marked in solid lines when it is furthest away from proximity to the seated occupant 20 allows him free access and exit to and from the seat 6. The dashed lines indicate the intermediate positions of the system from point A through points B,C and ending in the securely anchored position at point D.

FIG. 3 is a diagrammatic front view showing front seat occupants 20 and 21 wearing their restraining devices 10 comprising lap-belt portions 11 secured at their inboard ends to vehicle floor 5 or to the bottom of the "Central-Post" 25 at 29, while their shoulder-belt portions 12 are adjustably secured by upper anchor means 32 to upper portion of the post 25, with the mid-portions of restraining devices 10 securely anchored by belt-carrier assemblies 35 to the back bottom corners of the inner door panels 4.

Figures 4, 5, 8, 9, 10, 12, 13:
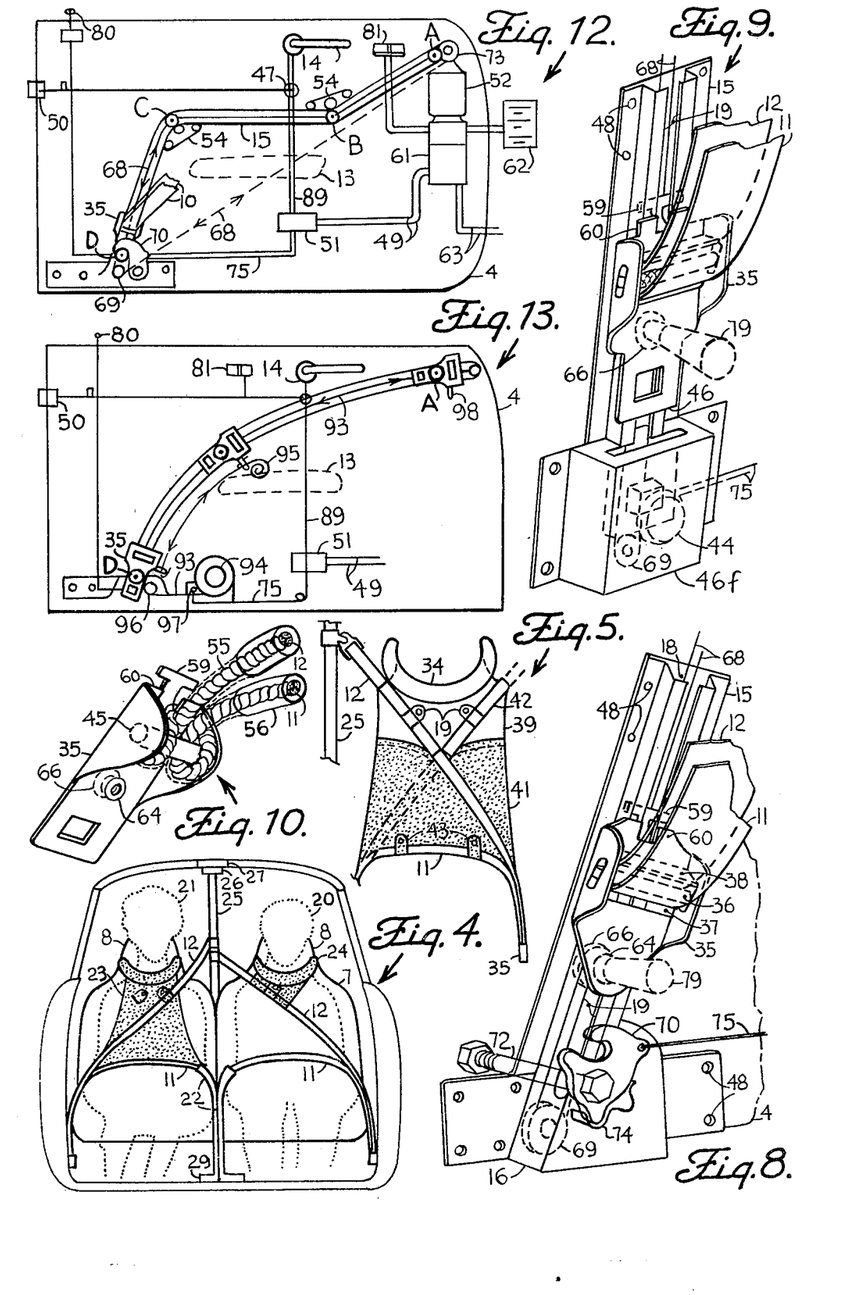
FIG. 4 shows modifications of the device.
FIG. 5 shows still another modification of the device.
FIG. 8 is a detail partial view of the anchoring means.
FIG. 9 is another detail view of another anchoring means.
FIG. 10 shows one way to anchor cable type restraining device.
FIG. 12 shows a typical layout for the front door system.
FIG. 13 shows another layout for the front door system.

FIG. 4 is similar to FIG. 3, but shows some additional modifications of the present invention. Occupant 20 has attached to his shoulder-belt 12 an auxiliary "Top-Guard" as 24, configured according to Chika's U.S. Pat. No. 3,968,994 and the body restraining device worn by occupant 21 is further modified by combining the instant disclosure with the "Auto-Vest" body restraining device 23 as fully explained in Chika's U.S. Pat. No. 4,063,778. Many more embodiments of these personalized types of restraining devices maybe configured by combining them to meet the personal needs and preferences of their users.

FIG. 5 shows just one of such possible modifications of the instant invention, wherein the semi-rigid head-guard 34 is combined with more rigid chest-plate 39 into one resilient, rigid unit to fit the head, neck and chest dimensions of its user; the shoulder-belt 12 passing diagonally over the assembly from either direction is positioned in channel 42 and is secured to it by fasteners 19. The optional auxiliary plastron 41 spans the distance between the chest-plate 39 and the lap-belt 11 passing through loops 43 secured to the lower edge of the plastron 41 made of strong but pliable material. Such units are usable on either side of the vehicle. When the same person repeatedly occupies the same seat, such protective and convenience accessories as 23,24,39 with 41 or any others, they may be left attached to their respective belts or cables when the vehicle is parked, thus eliminating their repeated reinstallations and readjustments.

FIG. 6 is a detail perspective view showing preferred type of adjustable securement for the upper inboard end of the shoulder belt 12 by bracket 32 to the "Central-Post" 25 which is preferably of tubular cross section and provided with plural height stops 33 protruding from its circular contour along its upper portion as better seen in FIG. 1. The bracket 32 is configured of steel stamping with circular opening in it to allow it free rotation about the post 25. The circular opening has local enlargement 58 in its contour large enough to allow the bracket 32 to slide over the height stops 33, thus providing for the height adjustment of the shoulder belt portion 12. The means of adjustment shown in FIG. 6 are used only when people of different body dimensions occupy the seat, otherwise the preselected adjustment stays.

FIG. 7 is a detail view showing the preferred means for anchoring the cable-type body restraining device to the post 25. The circular steel ring 30 fits slidably over the post 25, and it is modified to provide rectangular enlargement 31 in its contour to accommodate the cable 12 to be secured to it as shown, and also providing space to slide the ring 30 over the height stops 33 and thus provide for the height of the restraining device. The slidable lock-sleeve 65 keeps the cable 55 in its preselected length, the cable end-stop 67 prevents the cable from being untied from the post 25.

FIG. 8 is a perspective phantom view showing one of the preferred fail-proof ways of anchoring the mid-section of the presently disclosed restraining system 10 to the belt-carrier 35 shown just before sliding into latch-pawl 70 of the back terminal 16 secured to the rigid portion of the rigid side or door structure 4. Referring momentarily to FIG. 1, the lower back end of the guide channel 15 terminates in anchor terminal assembly 16 which is secured as far down and back of its seated user as practical, and its upper forward terminal 17 as far forward and upward as practical. The line of the intermediate delineation of the channel between its terminals 16 and 17 is determined not only by the specific configuration of the instant system being considered for any specific embodiment, but by the size of the door panel 4, its relative proportions, its proximity to the seat, location of various accessories and controls, and therefore varies as indicated in FIGS. 1, 2, 12, 13, 15, 16 and 17.

The back terminal assembly 16 is secured to the rigid door structure 4 by fasteners 48 and specifically configured heavy bolt 72 around which freely rotates latch-pawl 70 configured for fail-proof engagement with special bolt 64 secured to lower portion of the belt-carrier assembly 35 which is configured for slidable back and forth movement along the open section 18 of the channel 15. The upper portion of the assembly 35 is configured to form channel guide means 59 and slide plates 60, the lower portion of it guided and aligned by means of the bolt 64 gliding within the channel slot 19 and the guide roller 66 rolling within the channel space 18. Thus, the whole back face of the assembly 35 slides freely back and forth over the front face of the channel 15, which is attached to the door panel by fasteners 48, since it only supports the loosened device 10 when it is being removed to its forward, inactive position, free of any excessive strain against it.

When reaching the back bottom location, the bolt 64 engages the open latch-cam 70 to lock around it, thus anchoring the whole assembly to the rigid structure of the door panel 4 by means of the heavy bolt 72. The cam 70 is kept open by spring means 74 and the release cable 75 is actuated by the door handle 14 or by electrically powered control means as 81 dictated by the overall layout of the device. In a hand operated model the handle 79 secured to the extended bolt 64 is used and the belt carrier assembly 35 is released by such as latch release 44 shown in FIG. 9.

Endless type cable 68 has one of its ends secured to lower end of belt carrier 35, is looped about pulley 69, extends upward and forward through space 18 of channel 15 to forward terminal 17, loops about another pulley 69 located therein and returns back for securement to the upper end of the belt carrier assembly 35. The carrier assembly 35 comprises opening 37 for operative passage of webbing 11–12 about friction bar 36 and specifically configured locking flange 38 which allows free travel of the webbing 11–12 in either direction at all times except when the belt carrier 35 is locked at its position 16 and the seat occupant using this device is subjected to severe deceleration forces.

FIG. 9 shows another preferred configuration of anchoring the body restraining system 10 which is usable with the commonly usable buckle-type latching means. The channel 15 configuration is basically similar to one explained in FIG. 8, but the belt carrier 35 has its lower portion configured into a latch plate 46 engageable with commonly used female part of buckle means as 46f, configured to be releasable by either hand actuated button 44, by mechanical means connected to door handle 14 or by electrically powered means of any desired sequence and configuration through wires 75. Optional handle 79 is employed in hand-operated combinations in conjunction with hand release button 44.

FIG. 10 shows another modification of the belt carrier 35 to be used when the webbing of the restraining system 10 is replaced by nylon cable 55 of qualified tensile strength and enclosed by clear vinyl tubing 56 as more fully disclosed in Chika's U.S. Pat. No. 4,063,778. While the general configuration of carrier 35 is of any previously disclosed configuration, its sides are modified to secure the anchor bar 45 around which the cable 55 is adjustably looped, thus dividing the safety device 10 into its lap-portion 11 and shoulder belt portion 12. The vinyl tubing 56 may be locally modified into smaller diameter in that portion of it which is subject to direct contact with the anchor bar 45. This configuration is adaptable for use by invalids, children and those of unpredictable or involuntary behavior tendencies.

It is well known fact that ordinary belt webbing is not only unsanitary and abrasive on continuous contact with bare skin of neck, face and any other part of body, and also that during severe deceleration of the vehicle its edges cut tender body tissues and that they tend to "fold" on themselves, forming a dull edge of less than 5 mm width which causes damage to soft parts of human anatomy. Clear vinyl tubing as 56 keeps the restraining device always sanitary, easy to clean and inspect for wear and damage after a collision of the vehicle. Very easy proportional length adjustment between lap portion 11 and chest portion 12 is provided by simply loosening one and pulling on the other portion as it slides around the bar 45. Under any sudden pull on either portion the cable positively locks without any slippage.

Figures 14, 15, 16, 17:
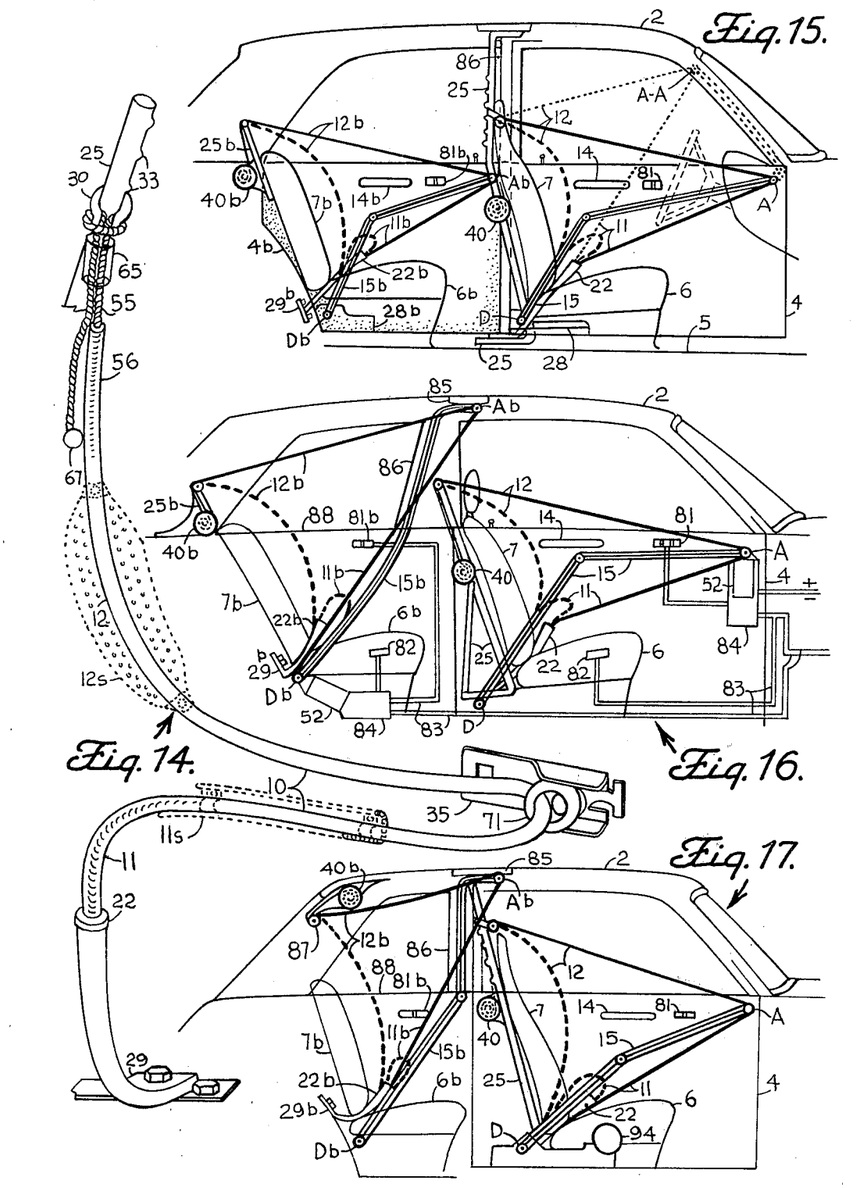
FIG. 14 shows an overall view of a cable-type safety device.
FIG. 15 is a side view layout of a typical 4-door configuration.
FIG. 16 is a side view layout of a typical 2-door configuration.
FIG. 17 is a side view layout of a typical small vehicle.

FIG. 11 illustrates still another modification of belt carrier 35 for use with one piece vinyl enclosed cable as is shown in overall view in FIG. 14. The belt carrier assembly 35 comprises specifically modified eye-bolt means as 71 with its cross section locally modified as shown at 73 to provide as smooth contact with the covered cable 55 as possible. This modification allows the greatest freedom of movement for its user at all times and during severe deceleration of the vehicle it tends to balance the distribution of the G load between the upper and lower portions of its user's seated body and its characteristics are almost opposite of those explained in FIG. 10.

FIG. 12 is a diagrammatic side view of a typical 2-door sedan door panel 4 with one of preferred arrangements of various controls used for proper operation of this invention. When the door handle 14 is activated, the linkage means 89 actuates pivot means 47, thus unlocking the door lock 50 and also releasing by means 75 the latch-pawl 70 from its engagement with the bolt 64, thus allowing the belt carrier 35 to travel upwardly and lifting the restraining device 10 upward and away from its contact with its user's seated torso. If the system is operated by electric power, the linkage means 89 also activates the switch 51 connected by wires 49 to the reversible type electrically powered motor 52 driving the gear reduction pulley assembly 73 which pulls the endless cable means 68 through channel 15, thus slidably propelling the belt carrier assembly 35 from point D to point A. The endless cable 68 may be returned in straight line as indicated by dashed lines to reduce friction. Strategically positioned corner glides 54 help the belt carrier 35 to negotiate the bends in channel 15. The above described operative sequence may be also initiated by releasing the door-lock release as 80 or hand-operated switch 81. Electrically powered, reversible motor 52 is powered by ordinary vehicle battery 62 and the control box 61 is connected by wires 63 to such vehicle components as odometer, seat weight sensors and other devices needed for proper operation of the restraining means. Thus the belt carrier 35 is never detachable from channel 15. When the door 4 is unlocked from the outside at 50, the belt carrier 35 is unlatched at point D and travels to point A, thus allowing easy access into the seat. When the door is closed, the belt carrier 35 stays at point A until either the engine is started, or the vehicle reaches predetermined speed, or control 81 is actuated; (or it may be wired to a delay-type switch); and then the belt carrier 35 travels slowly to the lower back point D, and stays locked in there until the vehicle is stopped, and the door handle 14 is actuated, when the process is repeated again.

FIG. 13 illustrates one of preferred configurations for semi-automatic operation of this invention. It is powered by the common type, flat, spiral-type spring means as 94 connected to proper length of the common "tape-measure" variety steel spring means 93, looped about idler wheel 96 and secured to the lower end portion of the belt-carrier assembly 35 which comprise a trigger means 98 configured to engage and wind up another auxiliary helper spring means 95 when the carrier 35 is descending downwardly toward its anchor point at D. Thus, when the door handle 14 is actuated, the spring lock 97 is released and the prewound helper spring 95 propels the carrier 35 upwardly, until its trigger 98 disengages from the spring 95, thus lifting the restraining assembly upward from its user's lap. As the door 4 is swung open further, the belt carrier 35 is urged toward point A, winding up the spring 94 by means of the steel pipe 93, and the spring lock 97 locks the spring 94 when the carrier 35 is at its position A.

As soon as the door 4 begins to close, the spring lock 97 is released, allowing spring 94 to urge assembly 35 from point A downward and back toward point D by means of the steel tape 93 until the trigger 98 engages with the unwound spring 95, winding it as it keeps descending into its anchored position at D, and the lock 97 is locked again. Of course, various "fail-safe" means may be incorporated into this device by connecting the switch 51 by wires 49 with the desired components of the vehicle as required to negate or activate various operations of the system.

FIG. 14 is an overall view of a restraining device 10, configured of nylon cable 55 of at least 10 mm in diameter and freely inserted within a clear vinyl tubing 56. Its upper inboard end is operatively, adjustably anchored to the post 25, and the vinyl tubing 56 may be omitted from that portion of it which is subject to adjustable securement of it to the upper anchor ring means 30. The lower inboard end is inserted through a semi-rigid sleeve 22 which preferably extends at least 150 mm above the upper contour of the seat cushion 6 and is secured to either the floor 5 or to the base of the post 25 by means as 29.

The middle portion of the restraining device 10 slides freely through the specifically configured eye bolt like means 71 secured operatively to the belt carrier assembly 35 as explained in FIG. 11. Of course, this type of configuration of the "cable-tube" restraining device is adaptable for any type of actuating system of the carrier assembly 35 over the channel means 15 disposed in any desired or required manner over the inboard surface of any vehicle side or door 4, be it of manual, semi-automatic, automatic or of fully passive configuration.

Variously configured auxiliary attachments are usable with this embodiment of this invention. They are further modifications of those disclosed in Chika's U.S. Pat. No. 3,968,994, but adapted to be securable in adjustable manner to the "cable-tube" 55–56 as shown in dotted lines. They are preferrably molded of clear, semi-rigid, perforated vinyl and may comprise such as separate, adjustably securable chest shields as 12s with optional chin guards as 24 in FIG. 4. Similarly configured lap-shields as 11s are adjustably securable to the lap portion 11. Thus, while one basic configuration of FIG. 14 may be standard with the vehicle, many variously sized and individually configured attachments for either portion 11 or 12 are exchangeably usable to suit various users size, needs and desires.

The above FIGS. 1–14 explain the basic principles of this invention as applied to the front seat of a motorcar. However, when modified to protect occupants of back seat of two-door or four-door sedans, and seats of other private or public transportation vehicles, certain modifications of the system have to be considered, and few of them are explained in FIGS. 15, 16 and 17 in a way of examples of the universal adaptability of this invention.

FIG. 15 shows a diagrammatic side view of a typical 4-door sedan with one of the preferred configurations of this invention operatively disposed over its inboard surfaces. The front door 4 configuration is similar to any one of those as described in FIGS. 1, 12 or 13, while the back seat configuration is modified as follows: the belt-guide channel means 15 is disposed over the inboard surface of the door panel 4b to fit its proportional dimensions and to insure the efficient performance of the restraining system. The inboard belt-guide booth 22b is anchored at 29b to the rigid body structure directly behind the seat cushion 6b and below the seatback cushion 7b. The outboard bottom anchor means 28b is secured to the rigid structure of the rear door panel 4b as far back and low as practical. For anchoring the upper inboard end of the shoulder-belt portion 12b, a modified "Central-Post" 25b as fully explained in Chika's U.S. Pat. No. 3,885,810 is provided and if required, an emergency locking retractor 40b is secured therein. If practical, the belt-guide channel means 15b may be extended upwardly over the window frame of door 4b to further facilitate the ingress and exit from the back seat 6b. Otherwise the configuration and operative sequences are similar to those of the front seat configurations explained previously.

FIG. 16 shows a diagrammatic side view of a typical 2-door sedan equipped with electrically powered, more sophisticated configuration of this invention. The front seat cushion 6 comprises 1 and back seat cushion 6b comprise 2 weight sensitive switches 82 connected by wires 83 to control units 84 which activate the specifically powered systems of selectively positioning the safety device 10 into and out of proximity to only those seats which are occupied. Thus, while the driver's seat is protected at all times, the systems for the seat next to him and the back seats are inactive unless they are occupied. Otherwise the operational details are as explained in previous Figures.

Typical layout for the rear compartment of a 2-door sedan is as follows: the inboard lower anchor 29b secures the device to rigid body structure directly back of and below the back seat cushion 6b; the channel 15b extends from as far back and down as possible over the surface of the side panel 88, crossing over to door pillar 86 all the way to the roof rail and if necessary extending transversely into the roof channel 85 and inboard as needed to allow free entry and exit to and from the back seat 6b. The inboard upper anchor means 25b is secured to the back seat rail. Emergency switch 81b activates the system when the vehicle is not moving.

FIG. 17 shows a diagrammatic side view of a typical 2 door compact vehicle with a third door on its back side. The system may be assisted by spring means as shown in FIG. 13 for manual operation. When powered by electricity, the remote control switch 81 is used. The channel 15b is disposed for easy sliding of belt carrier means 35 over the inboard side of panel 88, up the door pillar 86 and transversely over the roof channel 85 as far as needed to allow easy entrance and exit to and from the rear seat 6b. The inboard upper anchor means is secured to bracket 87 attached to the back roof rail spanning the back window of the vehicle and if needed, the emergency locking retractor 40b is secured to it. In those vehicles in which the seat-back cushion 7b is of the foldable type, without any rigid support at its top, the inboard lower anchor means 29b are secured directly to the rigid structure of the vehicle floor.

There are other useful applications of this broad inventive concept, such as the adaptive modifications of presently disclosed safety restraining means for use in mini-type vehicles and their various hibrids configured for local and metropolitan needs as disclosed in Chika's U.S. Pat. No. 4,217,970 as described in detail in its FIGS. 17 and 17-B. Also it should be noted that that further embodiments, modifications and adaptations of presently disclosed configurations could be usable in all types of commercial vehicles and compatibly configured mass transportation means.

The above described embodiments of this invention are intended to be merely exemplary and illustrative of its broad scope, and not limiting in any way, since many more variations, modifications and embodiments of them may be configured without departing from the true scope of this broad invention, and in combination with related existing art of record. Therefore all of such other modifications are intended to be included within the scope of this invention as claimed in the following appended claims.

I claim:

1. A vehicle seat occupant restraining device adjustably positionable into and out of the immediate proximity to the occupant of a seat located next to a rigid side or a side door of a transportation vehicle comprising:

a continuous length of suitably configured webbing or cable type material forming a combination lap-belt and shoulder-belt restraining device (10), the inboard end of the lap-belt portion (11) anchored to the vehicle floor inboard and behind the seated occupant, the inboard upper end of the shoulder-belt portion (12) adjustably anchored inboard and back of the seated occupant's head to specifically configured means (25), by specifically configured bracket means (32) adjustably engageable with said means (25) for adjustably fixing the effective length of the continuous overall length of the webbing or cable (10), the mid-portion of said webbing or cable type material slidably passing through an apperture in a carrier assembly means (35), thus adjustably, automatically, variably dividing said restraining device into its lap-portion (11) and shoulder-portion (12), the carrier assembly (35) configured to be operatively slidable along a track channel means (15) secured substantially diagonally over the inboard surface of said rigid side or door of said vehicle in nearest proximity to the outboard side of said seat, the rearward end of the track channel located as far downwardly and rearwardly from said seat as practical, its forward end located as far forwardly and upwardly from said seat as practical, means to slidably, operatively propel said carrier assembly means (35) back and forth between the opposite ends of said track channel means (15), means to repeatedly, securely lock said carrier means at the rearward and downward end of said track channel means to prevent its unwanted dislocation therefrom, means to repeatedly unlock said carrier means therefrom.

2. A restraining device as defined in claim 1, configured for manual operation of all of its functions at the will of its seated user.

3. A restraining device as defined in claim 1, comprising spring powered mechanical assist means to help in back and forth propulsion of said carrier means (35) over the length of said channel means (15).

4. A restraining device as defined in claim 1, wherein the movement of said carrier means along said channel means is initiated by remote control means, actuated and powered by hand, by specifically configured spring means and by electricity provided by said vehicle electrical system.

5. A restraining device as defined in claim 1, comprising such means as weight sensitive switches to determine the occupancy of said vehicle seats, means determining the ignition of said vehicle power plant, the forward speed of said vehicle, and other instruments commonly used to insure that whenever said vehicle is in forward motion, said carrier assembly will be locked at the rear end of said channel and will not be releasable therefrom while said vehicle is in motion.

6. A restraining device as defined in claim 1, wherein said seat is located next to a side door hinged at its forward edge to the rigid side structure of said vehicle, said carrier assembly (35) operatively engaged with said track channel (15) which is configured into the surface of said door in such manner that whenever said door is being opened, said carrier is urged forwardly towards the front end of said channel, and when said door is closed said carrier is being urged to slide into the lower back end of said channel means and locked therein.

7. A restraining device as defined in claim 1, comprising operatively interconnecting means between the commonly used door handles, door locks, and said carrier assembly (35) operatively functioning within said channel means (15) to insure that said carrier assembly shall not be released from its locked position unless said vehicle is not in motion, said door is unlocked and its door handle is activated.

8. A restraining device as defined in claim 1, comprising operatively interconnecting means between said safety device control means and the speedometer of said vehicle, means to prevent the release of said carrier from its locked position if said vehicle is in motion.

9. A restraining device as defined in claim 1, wherein said track channel means (15) is disposed substantially diagonally over the inboard surface of said rigid side or door structure in such manner that said restraining device shall be freely movable into and out of the immediate proximity to its user's body without interfering with door handle, window regulator, arm rest and other control means normally located on such vehicle sides and door panels.

10. A retraining device as defined in claim 1, configured for use by occupants of the back seat of a two door type of a passenger motor vehicle, wherein said track channel (15) is extended upwardly through the side panel, over the back pillar of the front door opening and into the roof panel as needed to provide sufficient room to allow easy entry and exit of passengers into and out from said back seat.

11. A restraining device as defined in claim 1, wherein said vehicle comprises side doors with plurality of seats disposed in close proximity to them, said track channel means disposed over interior surfaces of door panels immediately adjacent the outboard sides of said seats and continued upwardly over interior surfaces of the forward door pillars of said doors.

12. A restraining device as defined in claim 1, configured for use by occupants of a front seat of a close-coupled two door sedan, wherein the forward pillar of said side door is disposed substantially vertically, said channel assembly (15) is extended upwardly over its interior surface in such manner that whenever said door is opened, said carrier (35) is urged upwardly and forwardly to facilitate entry and exit into and out of said front seat.

13. A restraining device as defined in claim 1, wherein the lower rearward end of said track channel means (15) is secured to the rigid structural portion of said body side or said door by means sufficiently strong to prevent said carrier assembly (35) from being torn off even during the most severe collision of said vehicle.

14. A restraining device as defined in claim 1, wherein the carrier assembly (35) comprises specifically configured opening (37) with friction bar (36) to slidably, adjustably accept the mid-portion of the restraining device configured of the commonly used webbing material, to determine proportionally variable lengths of its lap-belt and shoulder-belt portions when said webbing is not subject to any severe tension, and to lock said webbing instantly within said aperture when said webbing is subjected to any severe tension on either portion of it.

15. A restraining device as defined in claim 1, wherein the carrier assembly (35) comprise specifically configured aperture means (71) to operatively, slidably accept the mid portion of the restraining device configured of sufficiently strong, pliable cable means enclosed within protective tubing.

16. A restraining device as defined in claim 1, configured of suitable cable means enclosed within preferably clear protective tubing of vinyl or the like.

17. A restraining device as defined in claim 1, wherein said protective tubing is specifically modified at those portions of it which are subject to constant friction and abrasion at its means of adjustable securements to excessive friction and abusive wear.

18. A restraining device as defined in claim 1, wherein said channel means (15) is of a rectangularly tubular cross sectional configuration (18) with longitudinally extending slot (19) on its outward facing side to slidably accommodate the leg of a T shaped guide member (59) forming one end of said carrier assembly (35) which has its opposite end-portion comprising roller means (66) to glide freely back and forth and rotate within the hollow channel (18) without allowing it to be detached therefrom.

19. A restraining device as defined in claim 1, wherein said carrier assembly (35) comprise on its lower portion specifically configured bolt means (64) for locking engagement with latch-pawl means (70) which is operatively secured to the rigid structure of said body side or side door, comprising remotely controlled means to release the latch-pawl means from contact with the bolt means to allow said carrier assembly to move therefrom.

20. A restraining device as defined in claim 1, wherein the lower portion of said carrier assembly is configured to form a male buckle part of common design which is easily connected and disconnected to and from commonly used, compatibly configured female buckle part anchored to the rigid structure of said body side or side door of said vehicle, including means to unbuckle the two parts by direct or remote control means.

21. A restraining device as defined in claim 1, comprising means to prevent disconnection of said carrier assembly (35) from the lower back end of said channel (15) while said vehicle is in motion.

22. A restraining device as defined in claim 1, wherein all necessary functions for proper operation of said device are of the semi-automatic type: controlled by hand and power assisted by variously configured spring means, of the tape-type, preenergized, self-energized, and energized by the opening and closing movement of said side door of said vehicle.

23. A restraining device as defined in claim 1, configured for automatic operation, requiring said seat occupant only to unlock said vehicle door from the outside, actuate the door handle to open said door, be seated in said seat, close the door and adjust the device to his upper torso to suit his personal convenience and comfort; in order to leave the vehicle, said occupant is required only to turn off the ignition key, actuate the inside door handle, open the door, exit from said seat and close said vehicle door.

24. A restraining device as defined in claim 1, operated by electrically powered reversible motors which are controlled by remote control means activated when said vehicle doors are opened and closed, when the engine of said vehicle is started, when said vehicle reaches predetermined speed, when and which seats of said vehicle are occupied, and other sensory means insuring that all seat occupants of said vehicle shall have a restraining device positioned in their immediate proximity before said vehicle attains certain speed and that one of said devices shall be removable from such close proximity to said seat occupants while said vehicle is in motion.

25. A restraining device as defined in claim 1, comprising means to negate any of the remote control means which activate various functions of said safety device, means to permit removal of said device from immediate proximity to its user when any of its operative mechanisms fail to do so.

26. A restraining device as defined in claim 1, wherein the lower inboard portion of the lap-belt portion of said device is enclosed in a semi-rigid booth (22) configured to be slidably, adjustably positionable over it to keep that portion of said system above the inboard thigh of its user.

27. A restraining device as defined in claim 1, wherein the specifically configured means (25) providing said inboard upper anchor for said device is configured as a "Central Post" assembly operatively secured to the middle of reinforced floor behind said front seat of said vehicle, extending upwardly for adjustment securement to the reinforced roof structure of said vehicle, the upper portion of said post configured for height adjustable anchoring of upper bracket means (32).

28. A restraining device as defined in claim 1, wherein said post (25) is also secured to said vehicle seat structures to allow back and forth adjustability of said seats and post in unison.

29. A restraining device as defined in claim 1, wherein said post means (25) is configured in a rearwardly inclined side view elevation, its upper end comprising ratchet means (26) cooperating with ratchet track (27) secured to reinforced roof (2) to serve as bracing means for said vehicle structure and said post during any severe collision of said vehicle.

30. A restraining device as defined in claim 1, adapted for use in the rear seat of a motor vehicle, wherein the upper end of the inboard shoulder-belt portion of said restraining device is adjustably anchored inboard and back of its seated user's head to specifically configured anchor means (40b) attached to rigid supporting means (25b) located back of said seat.

31. A restraining device as defined in claim 1, adapted for use in the rear seat of a compact vehicle without any rigid support back of said seat, wherein the upper inboard end of said device is secured to specifically configured anchor means (40b) secured to the rigid roof portion of said vehicle.

32. A restraining device as defined in claim 1 configured of commonly used webbing material, its upper inboard end of its shoulder-belt portion adjustably anchored to locking retractor means (40) secured to specifically configured post means (25).

33. A restraining device as defined in claim 1 configured with its upper inboard end of said shoulder-belt portion adjustably passing through typical guide-ring means replacing the upper anchor bracket means (32) and operatively attached to regular inertia-sensitive retractor means (40) anchored to structure (25).

34. A restraining device as defined in claim 1 wherein the upper inboard end of said cable-type safety device is configured to be slidably, adjustably tied to specifically configured anchor means (30) adjustably securable along specifically configured post means (25).

35. A restraining device as defined in claim 1, wherein the shoulder-belt portion of said restraining device is modified to operatively support specifically configured auxiliary "Top-Guard" individual body restraining means (24, FIG. 4) to provide additional protection for its user's head and neck.

36. A restraining device as defined in claim 1, modified to operatively support specifically configured "Auto-Vest" individual body restraining devices (23, FIGS. 4,5).

37. A restraining device as defined in claim 1 modified to operatively accept and support varied combinations of specifically configured comfort, convenience and bodily protection providing accessories.

38. A restraining device as defined in claim 1, configured for completely manual operation, wherein said carrier assembly (35) is manually operable by the occupant of said seat by sliding the handle means (79) between the back terminal (D) and front terminal (A) of said channel means (15) by his hand, said front terminal (A) configured to permit complete removal of said carrier assembly (35) from said channel means (15) at the discretion of its user.

39. A restraining device as defined in claim 1, configured for manual control of said apparatus combined with mechanically powered auxiliary assist means to facilitate its manual actuation and control.

40. A restraining device as defined in claim 1, configured for manual locking of said carrier assembly (35) at its back terminal (D) by manual actuation of handle means (79) until said carrier assembly securely interlocks with specifically configured means within the back terminal (D) of said track channel (15).

41. A restraining device as defined in claim 1, configured for manual operation, wherein the action to repeatedly unlock said carrier assembly (35) from the back terminal (D) of said channel (15) must be preceded by the actuation of the release button means (44), or the actuation of the door-lock means (80) and or door-handle means (14), followed by manual actuation of handle means (79).

* * * * *